United States Patent
Huang

(10) Patent No.: US 10,906,833 B2
(45) Date of Patent: Feb. 2, 2021

(54) RESIDUAL MATERIAL REMOVING DEVICE, METHOD AND, SYSTEM

(71) Applicants: HKC CORPORATION LIMITED, Shenzhen (CN); CHONGQING HKC OPTOELECTRONICS TECHNOLOGY CO., LTD., Ba'nan District (CN)

(72) Inventor: Chunchin Huang, Ba'nan District (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 98 days.

(21) Appl. No.: 16/312,596

(22) PCT Filed: Nov. 7, 2017

(86) PCT No.: PCT/CN2017/109747
§ 371 (c)(1),
(2) Date: Dec. 21, 2018

(87) PCT Pub. No.: WO2018/121083
PCT Pub. Date: Jul. 5, 2018

(65) Prior Publication Data
US 2019/0315012 A1    Oct. 17, 2019

(30) Foreign Application Priority Data

Dec. 30, 2016 (CN) .......................... 2016 1 1270796

(51) Int. Cl.
*C03B 33/03* (2006.01)
*B26F 3/00* (2006.01)
(Continued)

(52) U.S. Cl.
CPC ............. *C03B 33/03* (2013.01); *B23D 31/002* (2013.01); *B26F 3/002* (2013.01); *B28D 7/005* (2013.01);
(Continued)

(58) Field of Classification Search
CPC ............... Y10T 225/30; Y10T 225/307; Y10T 225/321; Y10T 225/325; Y10T 225/371;
(Continued)

(56) References Cited

U.S. PATENT DOCUMENTS 6,513,694 B1 * 2/2003 Xu ....................... B28D 5/0011
125/23.01
2008/0286943 A1 * 11/2008 Nishio .................. C03B 33/023
438/460

(Continued)

FOREIGN PATENT DOCUMENTS

CN       101770105 A      7/2010
CN       101825780 A      9/2010
(Continued)

OTHER PUBLICATIONS

English Translation of JP093009736. (Year: 1997).*
(Continued)

*Primary Examiner* — Jennifer B Swinney
(74) *Attorney, Agent, or Firm* — Westbridge IP LLC

(57) ABSTRACT

The present application provides a residual material removing device, method and system, in which the residual material removing device includes: a loading platform configured to support a material to be cut; a fixing plate abutting against an upper surface of the material to be cut is configured to fix the material to be cut, and one end of the fixing plate is in contact with a residual material in the material to be cut; a first pressing portion in contact with one end of the fixing plate is configured to apply pressing force to one end (Continued)

of the fixing plate to separate the residual material from the material to be cut under the action of the pressing force.

19 Claims, 2 Drawing Sheets

(51) Int. Cl.
  *B23D 31/00* (2006.01)
  *B28D 7/00* (2006.01)
  *G02F 1/13* (2006.01)
  *G02F 1/1333* (2006.01)
(52) U.S. Cl.
  CPC ............... *G02F 1/1303* (2013.01); *G02F 2001/133302* (2013.01); *Y10T 225/371* (2015.04)
(58) Field of Classification Search
  CPC ..... C03B 33/033; C03B 33/07; C03B 33/072; C03B 33/03; C03B 33/037
  USPC .................................................... 225/92, 93
  See application file for complete search history.

(56) References Cited

U.S. PATENT DOCUMENTS

| | | | |
|---|---|---|---|
| 2008/0311817 A1 | 12/2008 | Kawamoto | |
| 2017/0036369 A1* | 2/2017 | Li | B26F 3/02 |

FOREIGN PATENT DOCUMENTS

| | | | | |
|---|---|---|---|---|
| CN | 101968586 A | | 2/2011 | |
| CN | 203930277 U | | 11/2014 | |
| CN | 104386906 A | | 3/2015 | |
| CN | 104914605 A | | 9/2015 | |
| CN | 106738359 A | | 5/2017 | |
| EP | 2159016 A2 | * | 3/2010 | ............. B26F 3/002 |
| JP | 09309736 A | * | 12/1997 | ........... C03B 33/033 |
| JP | 2007099563 A | * | 4/2007 | ........... B65G 49/064 |

OTHER PUBLICATIONS

English Translation of JP2007099563. (Year: 2007).*
International Search Report including English-language translation and Written Opinion dated Feb. 8, 2018 in corresponding International application No. PCT/CN2017/109747; 13 pages.

* cited by examiner

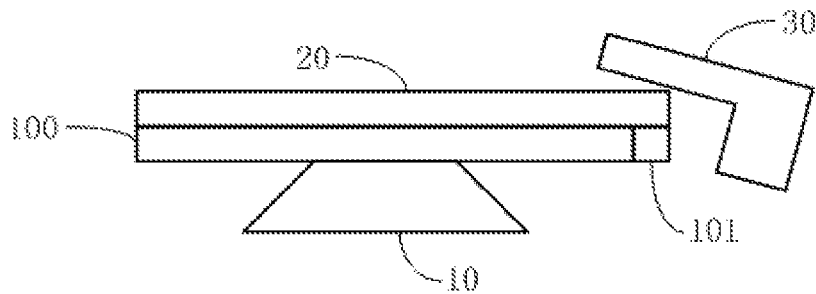

FIG. 1

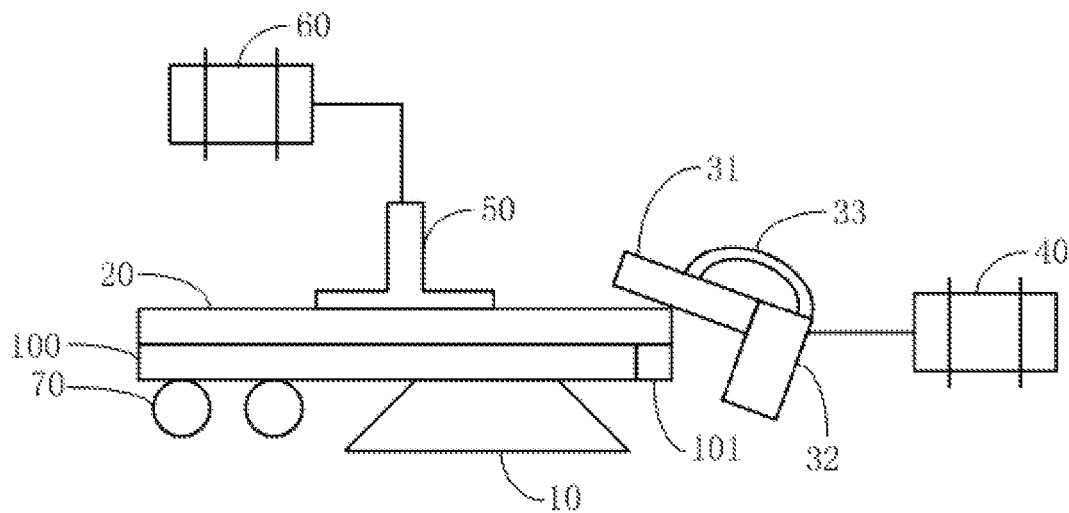

FIG. 2

| controlling the conveying portion to convey the material to be cut to a position of the loading platform right beneath the fixing plate; | S201 |
|---|---|
| controlling the fixing plate to tightly contact with an upper surface of the material to be cut to fix the material to be cut, and to contact one end of the fixing plate with the residual material in the material to be cut; | S202 |
| controlling the first pressing portion to apply pressing force to one end of the fixing plate to separate the residual material from the material to be cut under the action of the pressing force. | S203 |

FIG.3

RESIDUAL MATERIAL REMOVING DEVICE, METHOD AND, SYSTEM

CROSS-REFERENCE TO RELATED APPLICATION

This application is the International Application No. PCT/CN2017/109747 for entry into US national phase, with an international filing date of Nov. 7, 2017 designating the U.S., now pending, and claims priority benefits to Chinese Patent Application No. 201611270796.8, filed on Dec. 30, 2016, the contents of which being incorporated herein by reference.

FIELD

The present application relates to the technical field of mechanical automation, and more particular to a residual material removing device, a method, and a system.

BACKGROUND

With the continuous development of mechanical automation technology, mechanical apparatus has been gradually replacing traditional manual labor and playing a huge role in automated production. Cutting apparatus is a common automated apparatus, and the material being cut is cut, and the residual material being cut is gripped by using the mechanical jaws to separate the residual material from the material being cut, thereby completing the cutting process of a material.

SUMMARY

The size of residual material remaining after some materials being cut is very small, and the residual material is not easily gripped by the mechanical jaws, thereby making it difficult to separate the residual materials, especially the frame of residual materials remaining after the liquid crystal panel and the like being cut is very narrow, and the traditional separation mechanism can not achieve the ideal separation effect, and it is very easy to damage the effective part of the liquid crystal panel, resulting in a high defect rate.

The embodiment of the present application provides a residual material removing device, which includes:

a loading platform configured to support a material to be cut;

a fixing plate, in tight contact with an upper surface of the material to be cut, and configured to fix the material to be cut, and one end of the fixing plate is in contact with a residual material in the material to be cut; and a first pressing portion, in contact with one end of the fixing plate, and configured to apply a pressing force to one end of the fixing plate to separate the residual material from the material to be cut under the action of the pressing force.

Optionally, the first pressing portion includes a pressing end and a fixing end, and the pressing end and the fixing end are connected via an elastic buffer material.

Optionally, the elastic buffer material is any one of a non-rubber, a non-silica gel material, a rubber or a silica gel with a hardness lower than glass.

Optionally, the residual material removing device further includes a first drive motor, the first drive motor connected to the first pressing portion and configured to drive the first pressing portion to contact with one end of the fixing plate.

Optionally, the first drive motor is a servo motor.

Optionally, the residual material removing device further includes a control portion connected to the first drive motor and configured to control an operating state of the first drive motor.

Optionally, the residual material removing device further includes a second pressing portion connected to the upper surface of the fixing plate and configured to control the fixing plate to move up and down to fix the material to be cut by the fixing plate presses downward.

Optionally, the residual material removing device further includes a second drive motor connected to the second pressing portion and configured to drive the second pressing portion to move up and down.

Optionally, the material removing device further includes: a control portion, connected to the first drive motor and the second drive motor and configured to control the first drive motor and the second drive motor to move.

Optionally, the second pressing portion is a mechanical link or a mechanical arm.

Optionally, the residual material removing device further includes: a conveying portion, disposed at an end of the loading platform away from the first pressing portion and configured to convey the material to be cut to a position of the loading platform right beneath the fixing plate.

Optionally, the conveying portion is any one of a mechanical arm, a conveyor, a roller mechanism, and a drive gear.

Optionally, the material to be cut is a glass substrate of a liquid crystal display panel.

Optionally, the loading platform is a trapezoidal platform, a square platform, or constituted by a plurality of discrete structures arranged side by side.

Optionally, an upper surface of the loading platform is in surface contact, distributed line contact, or distributed point contact with a lower surface of the material to be cut.

Optionally, the material to be cut is any one of a liquid crystal panel, a glass, a ceramic, a metal material, and a wood.

Another aspect of the embodiment of the present application further provides a residual material removing method, which is implemented based on the residual material removing device, the residual material removing device includes a loading platform, a fixing plate, a first pressing portion, and a conveying portion, and the residual material removing method includes:

controlling the conveying portion to convey the material to be cut to a position of the loading platform right beneath the fixing plate;

controlling the fixing plate to tightly contact with an upper surface of the material to be cut to fix the material to be cut, and to contact one end of the fixing plate with the residual material in the material to be cut; and controlling the first pressing portion to apply pressing force to one end of the fixing plate to separate the residual material from the material to be cut under the action of the pressing force.

Optionally, the residual material removing method further includes:

regulating a magnitude of the pressing force applied to one end of the fixing plate by the first pressing portion according to a hardness and a thickness of the material to be cut.

Another aspect of the embodiment of the present application further provides a residual material removing system, which is implemented based on a residual material removing device, the residual material removing device includes a loading platform, a fixing plate, a first pressing portion, and a conveying portion, and the residual material removing systems includes:

a processor, a communication interface, a memory and a bus;

wherein communication of the processor, the communication interface and the memory with one another is achieved via the bus;

the communication interface is configured to communicate with an external device.

the processor is configured to execute a program; and the memory is configured to store a program;

the program specifically includes:

a conveying portion controller configured to control the conveying portion to convey the material to be cut to a position of the loading platform right beneath the fixing plate;

a fixing plate controller configured to control the fixing plate to abut against an upper surface of the material to be cut to fix the material to be cut, and to contact one end of the fixing plate with the residual material in the material to be cut; and a first pressing portion controller configured to control the first pressing portion to apply pressing force to one end of the fixing plate to separate the residual material from the material to be cut under the action of the pressing force.

Optionally, the program specifically includes:

a pressing force regulator configured to regulate a magnitude of a pressing force applied to one end of the fixing plate by the first pressing portion according to a hardness and a thickness of the material to be cut.

In the embodiment of the present application, by the method of applying pressing force to the residual material in the material to be cut, to break a cutting line on the material to be cut subjected to stress, so that the residual material is separated without damaging the effective portion on the material to be cut, and it is particularly suitable for the liquid crystal panel products with residual materials having a narrow size, the structure is simple and suitable for widespread use.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

FIG. 1 is a structural block diagram of a residual material removing device provided by an embodiment of the present application;

FIG. 2 is a structural block diagram of a residual material removing device provided by an embodiment of the present application;

FIG. 3 is a flow chart of a residual material removing method provided by an embodiment of the present application;

DETAILED DESCRIPTION OF THE DRAWINGS

Figure 4:
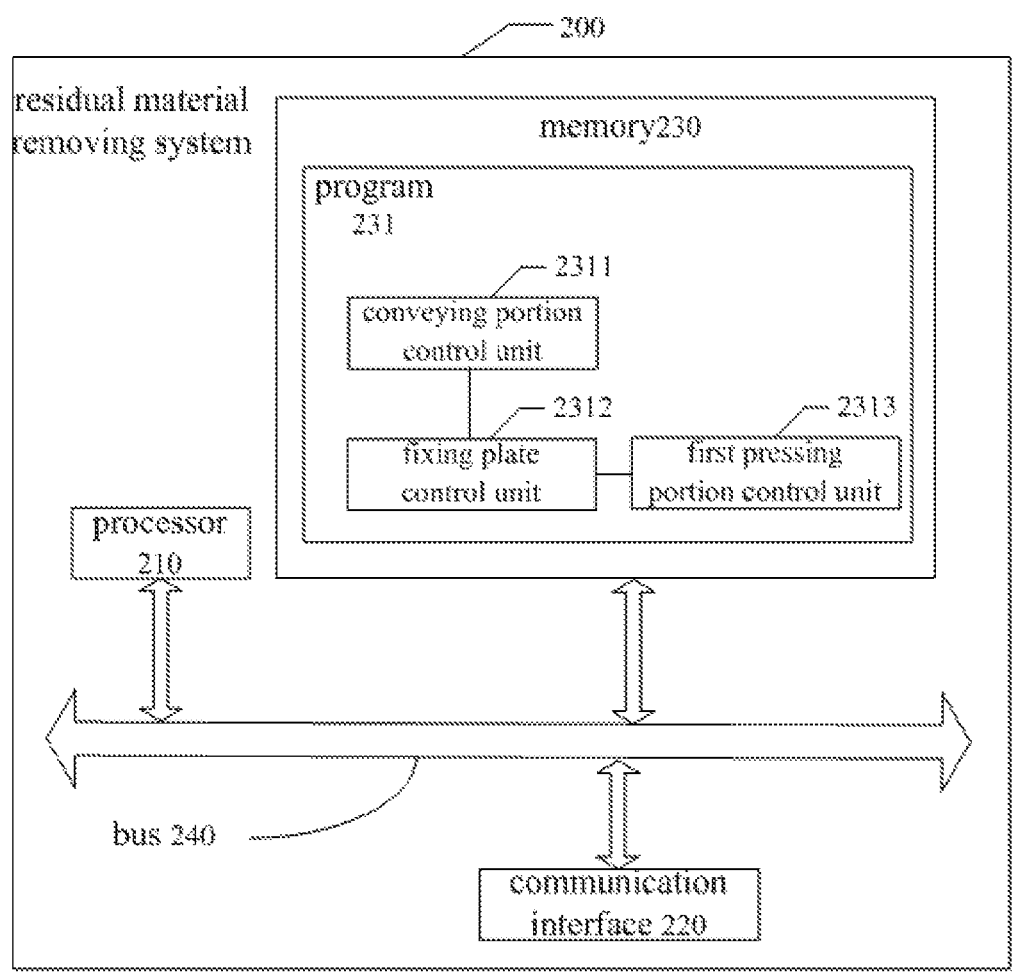
FIG. 4 is a structural block diagram of a residual material removing system provided by an embodiment of the present application.

In order to make those skilled in the art to better understand the technical solution, the technical solution in the embodiment of the present solution will be clearly described below with reference to the accompanying drawings in the embodiments of the present embodiment, it is obvious that the described embodiment of the solution is a part of the embodiments, not all of the embodiments. Based on the embodiments in the present solution, all other embodiments obtained by those skilled in the art without creative efforts shall fall within the scope of protection of the present solution.

The term "comprise" and variations of the terms in the specification and claims of the present application and the above-described drawings are intended to cover non-exclusive inclusions. Moreover, the terms "first" and "second" and the like are used to distinguish different objects, and are not intended to describe a particular order.

As shown in FIG. 1, an embodiment of the present application provides a residual material removing device including a loading platform 10, a fixing plate 20, and a first pressing portion 30.

The loading platform 10 is configured to support the material to be cut 100.

In one embodiment, the material to be cut 100 may specifically be a glass substrate of a display panel.

In a specific application, the display panel can be any type of display panel, such as a liquid crystal display panel based on TFT-LCD (Thin Film Transistor Liquid Crystal Display) technology, a liquid crystal display panel based on LCD (Liquid Crystal Display) technology, an organic electro-laser display panel based on OLED (Organic Electroluminescence Display) technology, a quantum dot light-emitting diode display panel or a curved surface display panel based on QLED (Quantum Dot Light Emitting Diodes) technology, etc.

In a specific application, the loading platform 10 may be a trapezoidal platform, a square platform or is constituted by a plurality of discrete structures arranged side by side, and an upper surface of the loading platform 10 may be in surface contact, distributed line contact (ie, multiple line contact locations) or distributed point contact (ie, multiple point contact locations) with a lower surface of the material to be cut 100, as long as it is ensured that the material 100 to be cut placed on the loading platform 100 is evenly stressed. In this embodiment, the loading platform 10 is the trapezoidal platform.

The fixing plate 20 is in close contact with the upper surface of the material to be cut 100 and configured to fix the material to be cut 100, and one end of the fixing plate 20 is in contact with the residual material 101 on the material to be cut 100.

In a specific application, in order to convey the pressing force to the cutting line on the material to be cut 100 after the fixing plate 20 is subjected to the pressing force of the first pressing portion 30, the fixing plate 20 may not be in contacted with an entire of the residual material 101, but is in contact with at least a partial of the residual material 101. In a special case, for example, when the size of the residual material 101 is on the magnitude of millimeters, it is preferable to bring the fixing plate 20 in entire contact with the residual material 101 to ensure that the pressing force applied by the first pressing portion 30 is sufficient to break the cutting line to separate the residual material 101.

In a specific application, the fixing plate 20 may be any structure capable of being in surface contact, distributed line contact, or distributed point contact with the upper surface of the material to be cut 100, as long as it is ensured that the material 100 to be cut placed on the loading platform 100 is evenly stressed. In this embodiment, the loading platform 10 is a flat plate structure.

The first pressing portion 30 is in contact with one end of the fixing plate 20 and configured to apply a pressing force to one end of the fixing plate 20 to separate the residual material 101 from the material to be cut 100 under the action of the pressing force.

In a specific application, the first pressing portion 30 is of any structure capable of being in contact with one end of the fixing plate 20. In a special case, for example, when the size of the residual material 101 is on the magnitude of millimeters, in order to avoid damage to the material to be cut 100 when the residual material 101 is separated, the first pressing portion 30 may be selected to be a buffered structure that gently applies pressing force to the fixing plate 20.

The residual material removing device provided in the present embodiment can be applied to any material, and by regulating the pressing force applied to the fixing plate by the first pressing portion 30, the residual material on the brittle material such as a liquid crystal panel, a glass, or a ceramic or the like can be effectively removed. It is also applicable to metal materials such as ordinary steel, iron products, and aluminum products, as well as wood and plastics.

In this embodiment, by the method of applying pressing force to the residual material in the material to be cut, a cutting wire on the material to be cut is subjected to stress and broken, so that the residual material is separated without damaging the effective portion on the material to be cut, and it is particularly suitable for the liquid crystal panel products with residual materials having a narrow size, the structure is simple and suitable for widespread use.

As shown in FIG. 2, in one embodiment, the first pressing portion 30 includes a pressing end 31 and a fixing end 32, and the pressing end 31 and the fixing end 32 are connected via an elastic buffer material 33.

In a specific application, the first pressing portion 30 in the embodiment shown in FIG. 2 can be remoulded from the existing mechanical jaws, and can be achieved by removing the lower jaw of the mechanical jaw and adding an elastic buffer material to the remaining upper jaw.

In a specific application, the elastic buffer material 33 may specifically be selected from any of non-rubber, non-silica gel material, rubber, and silica gel with a hardness lower than glass, such as wood, plastic and the like. In the embodiment shown in FIG. 2, the elastic buffer material 33 is made of the rubber.

In a specific application, when the residual material removing device provided in this embodiment is configured to remove the narrow frame residual material on the liquid crystal panel, by adopting the first pressing portion with the elastic buffer material provided by the embodiment, the pressing force is gently applied to the fixing plate, so that the fixing plate conveys the pressing force to the cutting line of the material to be cut to break the cutting line by the stress, so that the residual material is separated, thereby effectively protecting the effective body portion on the material to be cut from being damaged.

The residual material removing device provided in this embodiment can be effectively applied to a brittle material having a narrow frame residual material.

As shown in FIG. 2, in one embodiment of the present application, the residual material removing device further includes a first drive motor 40, a second pressing portion 50, a second drive motor 60, and a conveying portion 70.

The first drive motor 40 is connected to the first pressing portion 30 and configured to drive the first pressing portion 30 to contact with one end of the fixing plate 20.

The second pressing portion 50 is connected to the upper surface of the fixing plate 20 and configured to control the fixing plate 20 to move up and down to press and fix the material to be cut by the fixing plate 20.

In a specific application, the second pressing portion 50 may be a mechanical link, a mechanical arm, or other transmission mechanism having a corresponding function.

The second drive motor 60 is connected to the second pressing portion 50 and configured to drive the second pressing portion 50 to move up and down.

In a specific application, the first drive motor 40 and the second drive motor 60 may each select a servo motor for precise controlling the first pressing portion 30 and the second pressing portion 50.

In one embodiment, the residual material removing device further includes a control portion connected to the first drive motor 40 and the second drive motor 60 for controlling the first drive motor and the second drive motor to rotate, the controller can be implemented by a general integrated circuit such as a CPU (Central Processing Unit) or an ASIC (Application Specific Integrated Circuit).

The conveying portion 70 is disposed at an end of the loading platform 10 away from the first pressing portion and configured to convey the material to be cut 100 to a position of the loading platform 10 right beneath the fixing plate 20.

In a specific application, the conveying portion 70 may be any one of a mechanical arm, a conveyor or a roller mechanism, or a drive gear. In this embodiment, the conveying unit 70 selects to be a roller mechanism.

As shown in FIG. 3, an embodiment of the present application further provides a residual material removing method, which is implemented based on the residual material removal device in the embodiment corresponding to FIG. 2, the residual material removing method includes:

Step S201: controlling the conveying portion to convey the material to be cut to a position of the loading platform right beneath the fixing plate;

Step S202: controlling the fixing plate to tightly contact with an upper surface of the material to be cut to fix the material to be cut, and to contact one end of the fixing plate with the residual material in the material to be cut;

Step S203: controlling the first pressing portion to apply pressing force to one end of the fixing plate to separate the residual material from the material to be cut under the action of the pressing force.

In one embodiment, the residual material removing method further includes: regulating magnitude of the pressing force applied to one end of the fixing plate by the first pressing portion according to a hardness and a thickness of the material to be cut.

In a particular application, the greater the hardness or the thickness of the material to be cut is, the greater the applied pressing force is, on the contrary, the lower the applied pressing force is.

As shown in FIG. 4, an embodiment of the present application further provides a residual material removing system 200, which is implemented based on the residual material removal device in the embodiment corresponding to FIG. 2, the residual material removing system 200 includes:

a processor 210, a communication interface 220, a memory 230, and a bus 240;

communication of the processor 210, the communication interface 220, and the memory 230 with one another are achieved via the bus 240;

the communication interface 220 is configured to communicate with an external device, such as a personal computer, a smart phone, or the like;

the processor 210 is configured to execute the program 231.

In particular, the program 231 can include program codes, the program codes include computer operating instructions.

The processor 210 may be a CPU (Central Processing Unit), or an ASIC (Application Specific Integrated Circuit), or one or more integrated circuits configured to implement the embodiments of the present application.

The memory 230 is configured to store the program 231. The memory 230 may include a high speed RAM memory and may also include a non-volatile memory such as at least one disk memory. The program 231 may specifically include:

a conveying portion controller 2311 configured to control the conveying portion to convey the material to be cut to a position of the loading platform right beneath the fixing plate;

a fixing plate controller 2312 configured to control the fixing plate to tightly contact with an upper surface of the material to be cut to fix the material to be cut, and to contact one end of the fixing plate with the residual material in the material to be cut;

a first pressing portion controller 2313 configured to control the first pressing portion to apply pressing force to one end of the fixing plate to separate the residual material from the material to be cut under the action of the pressing force.

In an embodiment of the present application, the program 231 may specifically includes:

a pressing force regulator configured to adjust a magnitude of a pressing force applied to one end of the fixing plate by the first pressing portion according to a hardness and a thickness of the material to be cut.

The steps in the method of the embodiment of the present application may be sequentially regulated, combined, and deleted according to actual requirement.

The units in the system of the embodiment of the present application may be combined, divided, and deleted according to actual requirement.

Those skilled in the art can understand that all or part of the process of implementing the above embodiment method can be completed by a computer program to instruct related hardware, and the program can be stored in a computer readable storage medium, when the program is executed, the flow of embodiments of the methods as described above may be included, wherein the storage medium may be a magnetic disk, an optical disk, a ROM (Read-Only Memory), or a RAM (Random Access Memory).

The aforementioned embodiments are only specific embodiments of the present application, and should not be regarded as being limitation to the present application, any modification, equivalent replacement, improvement, and so on, which are made within the spirit and the principle of the present application, should be included in the protection scope of the present application.

What is claimed is:

1. A residual material removing device, comprising:
a loading platform configured to support a material to be cut;
a fixing plate, in tight contact with an upper surface of the material to be cut, and configured to fix the material to be cut, wherein one end of the fixing plate is in contact with the residual material in the material to be cut;
a first pressing portion, in contact with one end of the fixing plate, and configured to apply pressing force to the one end of the fixing plate to separate the residual material from the material to be cut under the action of the pressing force; and
a second pressing portion, connected to an upper surface of the fixing plate and configured to control the fixing plate to move up and down to fix the material to be cut by the fixing plate pressing downward.

2. The residual material removing device of claim 1, wherein the first pressing portion comprises a pressing end and a fixing end, and the pressing end and the fixing end are connected via an elastic buffer material.

3. The residual material removing device of claim 2, wherein the elastic buffer material is any one of a non-rubber, a non-silica gel material, a rubber and a silica gel with a hardness lower than glass.

4. The residual material removing device of claim 1, wherein the residual material removing device further comprises a first drive motor, the first drive motor connected to the first pressing portion and configured to drive the first pressing portion to contact with one end of the fixing plate.

5. The residual material removing device of claim 4, wherein the first drive motor is a servo motor.

6. The residual material removing device of claim 4, wherein the residual material removing device further comprises a control portion connected to the first drive motor and configured to control an operating state of the first drive motor.

7. The residual material removing device of claim 1, wherein the residual material removing device further comprises a second drive motor connected to the second pressing portion and configured to drive the second pressing portion to move up and down.

8. The residual material removing device of claim 7, wherein the material removing device further comprises a control portion connected to the first drive motor and the second drive motor and configured to control the first drive motor and the second drive motor to move.

9. The residual material removing device of claim 1, wherein the second pressing portion is a mechanical link or a mechanical arm.

10. The residual material removing device of claim 1, wherein the residual material removing device further comprises: a conveying portion, disposed at an end of the loading platform away from the first pressing portion and configured to convey the material to be cut to a position of the loading platform right beneath the fixing plate.

11. The residual material removing device of claim 10, wherein the conveying portion is any one of a mechanical arm, a conveyor, a roller mechanism, and a drive gear.

12. The residual material removing device of claim 1, wherein the material to be cut is a glass substrate of a liquid crystal display panel.

13. The residual material removing device of claim 1, wherein the loading platform is a trapezoidal platform or a square platform, or is constituted by a plurality of discrete structures arranged side by side.

14. The residual material removing device of claim 1, wherein an upper surface of the loading platform is in surface contact, distributed line contact or distributed point contact with a lower surface of the material to be cut.

15. The residual material removing device of claim 1, wherein the material to be cut is any one of a liquid crystal panel, a glass, a ceramic, a metal material, and a wood.

16. A residual material removing method as implemented via a residual material removing device, the residual material removing device comprises a loading platform, a fixing plate, a first pressing portion, a second pressing portion, and a conveying portion, and the method comprises:
   controlling the conveying portion to convey the material to be cut to a position of the loading platform right beneath the fixing plate;
   controlling the fixing plate to tightly contact with an upper surface of the material to be cut to fix the material to be cut, and to contact one end of the fixing plate with the residual material in the material to be cut;
   controlling the first pressing portion to apply pressing force to one end of the fixing plate to separate the residual material from the material to be cut under the action of the pressing force; and
   controlling the second pressing portion to be connected to an upper surface of the fixing plate and control the fixing plate to move up and down to fix the material to be cut by the fixing plate pressing downward.

17. The residual material removing method of claim 16, the residual material removing method further comprises:
   regulating a magnitude of the pressing force applied to one end of the fixing plate by the first pressing portion according to the hardness and the thickness of the material to be cut.

18. A residual material removing system as implemented via a residual material removing device, the residual material removing device comprises a loading platform, a fixing plate, a first pressing portion, a second pressing portion, and a conveying portion, and the residual material removing systems comprises:
   a processor, a communication interface, a memory and a bus;
   wherein communication of the processor, the communication interface and the memory with one another is achieved via the bus;
   the communication interface is configured to communicate with an external device;
   the processor is configured to execute a program;
   the memory is configured to store the program;
   the processor comprises:
   a conveying portion controller configured to control the conveying portion to convey the material to be cut to a position of the loading platform right beneath the fixing plate;
   a fixing plate controller configured to control the fixing plate to tightly contact with an upper surface of the material to be cut to fix the material to be cut, and to contact one end of the fixing plate with the residual material in the material to be cut;
   a first pressing portion controller configured to control the first pressing portion to apply pressing force to one end of the fixing plate to separate the residual material from the material to be cut under the action of the pressing force; and
   a second pressing portion controller configured to control the second pressing portion to be connected to an upper surface of the fixing plate to control the fixing plate to move up and down to fix the material to be cut by the fixing plate pressing downward.

19. The residual material removing system of claim 18, wherein the program specifically comprises:
   a pressing force regulator configured to regulate the pressing force applied to one end of the fixing plate by the first pressing portion according to the hardness and the thickness of the material to be cut.

* * * * *